(12) United States Patent
Abreu et al.

(10) Patent No.: US 7,824,550 B2
(45) Date of Patent: Nov. 2, 2010

(54) FUEL FILTER

(75) Inventors: Ricardo Simoes de Abreu, Vinhedo-Sao Paulo (BR); Dietmar Gernand, Mogi Guacu-Sao Paulo (BR)

(73) Assignee: MAHLE International GmbH, Stuttgart (DE)

( * ) Notice: Subject to any disclaimer, the term of this patent is extended or adjusted under 35 U.S.C. 154(b) by 963 days.

(21) Appl. No.: 11/632,404

(22) PCT Filed: Mar. 25, 2006

(86) PCT No.: PCT/DE2006/000532

§ 371 (c)(1),
(2), (4) Date: Jan. 12, 2007

(87) PCT Pub. No.: WO2006/105755

PCT Pub. Date: Oct. 12, 2006

(65) Prior Publication Data

US 2007/0241044 A1    Oct. 18, 2007

(30) Foreign Application Priority Data

Apr. 2, 2005    (DE) .................. 10 2005 015 194

(51) Int. Cl.
*B01D 17/04* (2006.01)
*B01D 35/16* (2006.01)
(52) U.S. Cl. .................. 210/313; 210/315; 210/248
(58) Field of Classification Search .......... 210/313, 210/315, 248
See application file for complete search history.

(56) References Cited

U.S. PATENT DOCUMENTS 3,228,527 A * 1/1966 McPherson ............. 210/307
3,322,280 A * 5/1967 Taylor ..................... 210/94
4,253,954 A * 3/1981 Midkiff et al. ........... 210/315
4,502,955 A   3/1985 Schaupp et al.
4,626,348 A * 12/1986 Stone ..................... 210/248

(Continued)

FOREIGN PATENT DOCUMENTS

DE    34 40 506 A1    5/1986

(Continued)

OTHER PUBLICATIONS

International Search Report, Jun. 2006.

*Primary Examiner*—Thomas M Lithgow
(74) *Attorney, Agent, or Firm*—Collard & Roe, P.C.

(57) ABSTRACT

The invention relates to a fuel filter through which the fuel is to flow, in which water-separating, permeable layers are arranged spaced apart from one another in the direction of flow upstream of the filter layer, each time during operation of the filter the free space that lies between the two layers is connected to a first water collecting space, lying on the bottom of the filter, the first water collecting space lies below both the filter layer and the two permeable layers, is intended to permit a high degree of water separation. For this purpose, such a fuel filter is distinguished by the fact that the filter tube space lying upstream of the layer that is flowed through first of the two layers is connected to a second water collecting space within the filter, the assignment of which to the filter layer on the one hand and to the two permeable layers on the other hand coincides with that of the first water collecting space with respect to these components.

12 Claims, 1 Drawing Sheet

U.S. PATENT DOCUMENTS

Figure 1:
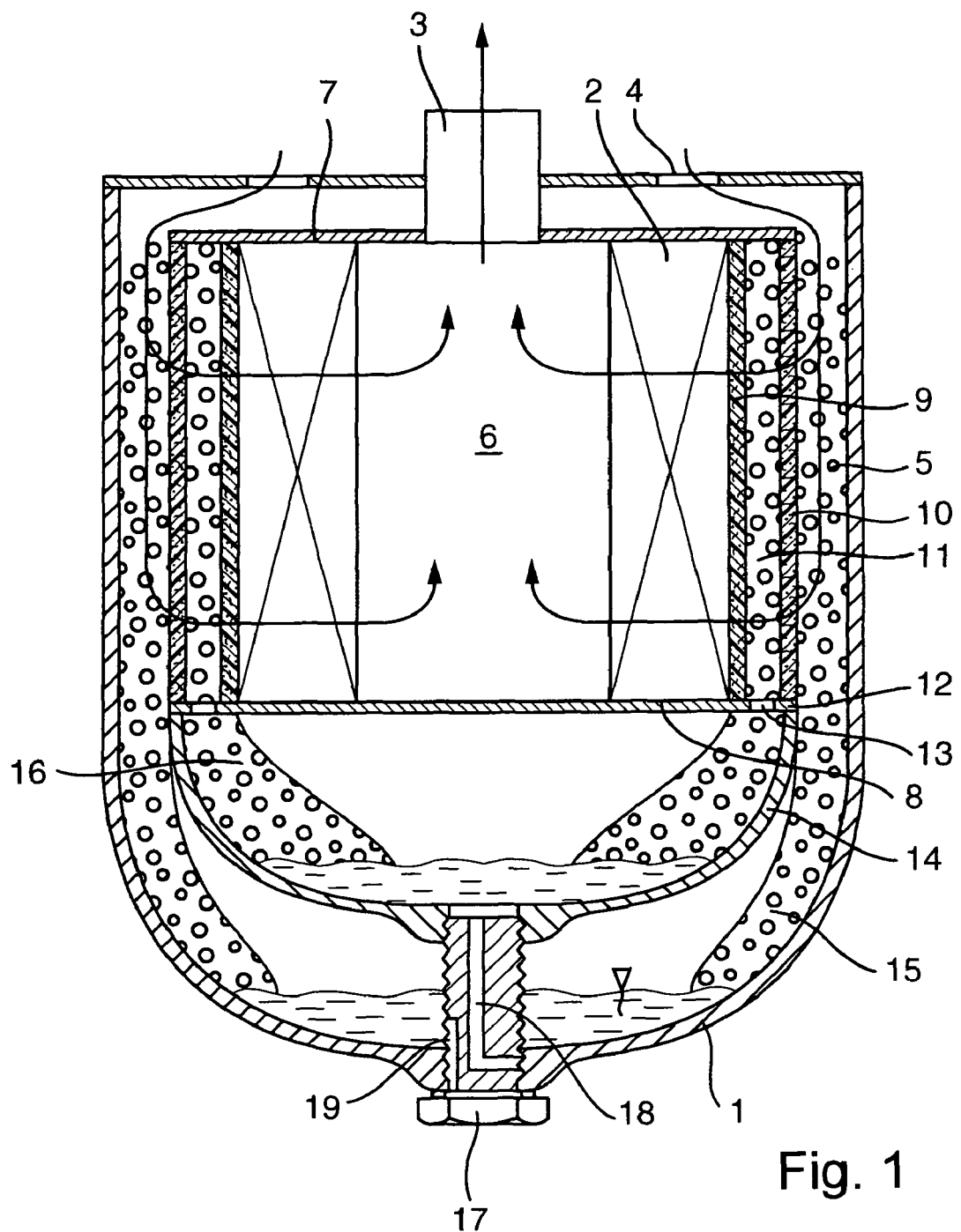

| | | | |
|---|---|---|---|
| 4,995,974 A * | 2/1991 | Lorey et al. | 210/247 |
| 6,716,349 B2 * | 4/2004 | Baracchi et al. | 210/299 |
| 2005/0000198 A1 | 1/2005 | Jokschas et al. | |

FOREIGN PATENT DOCUMENTS

| | | |
|---|---|---|
| DE | 101 23 190 A1 | 11/2002 |
| DE | 103 08 427 A1 | 9/2004 |
| EP | 0 260 069 A | 3/1988 |
| EP | 1 194 207 B1 | 4/2002 |
| GB | 1028100 | 3/1965 |
| GB | 2 115 305 A | 9/1983 |

* cited by examiner

FUEL FILTER

CROSS REFERENCE TO RELATED APPLICATIONS

Applicants claim priority under 35 U.S.C. §119 of German Application No. 10 2005 015 194.9 filed Apr. 2, 2005. Applicants also claim priority under 35 U.S.C. §365 of PCT/DE2006/000532 filed Mar. 25, 2006. The international application under PCT article 21(2) was not published in English.

The invention relates to a fuel filter according to the preamble of claim 1.

Such a filter known from DE 101 23 190 A1 is an annular filter element, wherein the free space provided for the water separation between the two permeable layers lying spaced apart from one another is connected to a water collecting space lying below during operation of the filter.

In the case of a device known from DE 34 40 506 A1, a coalescer element and a separator element are disposed coaxially with respect to one another, the coalescer element lying on the outside and the separator element on the inside. During the operation of this device, a flow passes through these two aforementioned elements from the outside inwards. The water that is possibly present in a fuel flowing through this device is coalesced in the coalescer element and, in a free space lying between the coalescer element and the separator element, is carried away downwards by reason of the gravitational force into a water collecting space. There is only a single water-separating and permeable layer present. With this device, there is only a single water collecting space present for separated water.

There is known from EP-A-0 260 069 a filter device with a filter layer through which a fuel is to flow, wherein water separation is brought about solely by this filter layer as such.

In a fuel filter known from DE 103 08 427 A1, at least one filter layer is present through which a flow is to pass radially. A water collecting space is provided both on the untreated side and also on the clean side of this filter layer. Additional, water-separating layers upstream or downstream of this filter layer are not present. The clean-side water collecting space lies inside the filter layer through which the flow is to pass radially, beneath which filter layer there is solely disposed the water collecting space on the untreated side.

In the case of the filter device known from U.S. Pat. No. 4,502,955, a further filter medium is disposed upstream of an annular filter medium, wherein the water can flow away downwards on account of its gravitational force from an intermediate space between the two filter media into a water collecting space. The annular filter medium is designed as a coalescer, i.e. the water separation takes place by droplet enlargement inside the coalescer, in order to achieve or to promote water separation due to gravitational force downstream of the filter medium.

GB-A-2 115 305 relates to a fuel filter with two filter media disposed one after the other in the flow direction and a cartridge with a further filter medium disposed above or more precisely downstream thereof. Provided in between is a free space, from which water drops can flow away into a water collecting space. Water can flow away into a further water collecting space upstream of the two filter media. The water passing from the free space into the respective water collecting space results from a coalescer separation effect inside the coalescer layer, i.e. the water is separated inside and not before the filter layer.

In a generic fuel filter, the invention is concerned with the problem of achieving water separation as complete as possible with a device constituted as simply as possible from the design and material standpoint.

This problem is solved by the embodiment of a generic fuel filter according to the characterising features of claim 1.

Advantageous and expedient developments are the subject-matter of the sub-claims.

The invention is based on the general idea of causing water inside the fuel filter to flow away in each case upstream of the two water-separating, permeable layers into water collecting spaces disposed spaced apart from one another both beneath these two layers and the filter layer. A surprisingly good, i.e. almost complete, water separation is achieved by this measure.

The principle described above applies to arbitrarily constituted filters, insofar as the latter possess only two permeable layers spaced apart from one another upstream of a filter element.

The principle according to the invention can be implemented particularly advantageously in the case of a fuel filter with an annular filter element through which a flow passes radially. In this case, the two permeable layers are provided concentrically outside the annular filter element. Whilst the two permeable layers have to be radially spaced apart from one another in order in this way to form the free space required for the water separation, the permeable layer adjacent to the annular filter element can be disposed directly on the external periphery of the annular filter element. This permeable layer can in particular be integrated radially externally into the annular filter element or even be constituted by the filter material of the annular filter element itself.

With such an annular filter element, the two water collecting spaces spaced apart from one another each lie in the form of tanks beneath the annular filter element, the first tank as a bottom tank lying inside the second tank likewise as a bottom tank. The water collecting space lying inside the first bottom tank has in the upward direction a boundary wall which is constituted on the one hand by the adjacent, closed end wall of the annular filter element and by an annular closure bottom of the free space lying between the two permeable layers, said closure bottom following on radially outwards from said end wall. This annular closure bottom contains connection openings between the interior of the first water collecting space and the free space between the two permeable layers. The number and size of the openings to be provided on the circular periphery can be optimised, especially experimentally.

The second water collecting space, which surrounds the first water collecting space, lies in a lower bottom tank, which is connected radially externally to the in-flow space of the radially external permeable layer, in order to be able to take up separated water there. The take-up of this separated water takes place by the fact that the water flows away downwards due to the gravitational force. The separated water arising in the free space between the two permeable layers passes in the same form into the first water collecting space.

In the embodiment of the filter according to the invention as an annular filter element, a closable channel leads out of the bottom of the first collecting space outwards through the second collecting space, in order that separated water can be carried away outside the filter.

An advantageous example of embodiment explained in greater detail below is represented in the drawing.

In the latter, the single

FIG. 1 shows a longitudinal section through a fuel filter with an annular filter element in the form of a diagrammatic representation.

An annular filter element 2 is mounted inside an external filter housing 1.

A fuel to be filtered flows through this annular filter element 2 radially from outside inwards, said fuel being able to leave the fuel filter through pipe socket 3 leading to the exterior. The fuel to be cleaned is introduced into filter housing 1 through inlet openings 4 disposed at an end face of housing 1 distributed over its periphery. The flowing of the fuel through the fuel filter is indicated by flow arrows. The space into which the fuel to be cleaned enters through inlet opening 4 is untreated space 5 of the filter. Clean space 6 of annular filter element 2 is connected in a flow-conveying manner to pipe socket 3. Apart from pipe socket 3, through which fuel can flow away, end faces 7 and 8 of annular filter element 2 are designed closed, i.e. no flow can pass through. End face 7 is assigned to pipe socket 3, whilst end face 8 is on the opposing side.

Two annular layers 9, 10 spaced radially apart from one another are located radially outside on the upstream side in front of annular filter element 2. Permeable layer 9 lies directly at the external periphery of annular filter element 2, whilst annular layer 10 is located radially farther outwards. Between the two annular layers 9, 10, an annular space as free space 11 is enclosed by these layers 9, 10. The closed end face 8 of the filter element extends over the external periphery of annular filter element 2 radially outwards and covers annular free space 11 at the respective end side. An annular closure bottom 12 thus arises. Axially penetrating openings 13 are provided distributed around the periphery in this closure bottom 12. At the end face of annular filter element 2 axially opposite the closure bottom, its end face 7 closes free space 11 lying adjacent there.

The open edge of a bottom tank 14 is tightly connected to the radially outer region of end face 8. Located between this bottom tank 14 and the end-face end of the fuel filter turned towards the latter is a water collecting space, which is hereby defined as the second water collecting space. This second water collecting space 15 is in a radially external, axially open connection with untreated space 5 of the filter.

Bottom tank 14 encloses between itself and end face 8 of the filter element a first water collecting space 16, which is connected in flow terms via openings 13 in annular closure bottom to free space 11.

A drainage screw is screwed into the lower region of housing 1 of the fuel filter that lies axially opposite pipe socket 3. The free end of this drainage screw 17 is screwed into the bottom region of bottom tank 14 thereby closing first water collecting space 16 to the exterior. Provided in drainage screw 17 are separate drainage channels 18 and 19, through which the water collected in water collecting spaces 15, 16 can flow away after loosening of the screw. Drainage channel 18 can in principle be dispensed with. Without such a drainage channel 18, drainage screw 17 merely has to be unscrewed completely from the opening in closure bottom 12. The water present in the first water collecting space 16 then flows away to the exterior via second water collecting space 15 through channel 19 via drainage screw 17.

If water-containing fuel flows through the filter according to the invention, water is separated in the form of droplets in each case at the radially outward-pointing surface of the two permeable layers 9 and 10, said droplets being able to flow away in each case into respective water-collecting space 15, 16.

Drainage screw 17 merely has to be opened in order to empty water collecting spaces 15 and 16.

Permeable layers 9, 10 can be made from the most diverse materials. Particularly suitable, of course, are those materials known per se which favourably influence water separation at their in-flow surface. In particular, hydrophobically acting materials can be used in each case. Permeable layers 9, 10 can comprise nonwoven fabric. These layers can in particular be made from so-called melt-blown material.

Different material can be used for the two layers 9, 10. The material selection can be made, amongst other things, with the aim of separating larger water droplets at the in-flow surface of radially outer layer 10 than at radially inner layer 9. Droplets which thus differ in size are marked in the drawing with reference to aforementioned permeable layers 9, 10.

All the features presented in the description and in the following claims can be essential to the invention both individually and also combined in any form with one another.

The invention claimed is:

1. A fuel filter with a filter layer through which the fuel is to flow, wherein
    water-separating, permeable layers (9, 10) are disposed spaced apart from one another in the flow direction upstream of the filter layer,
    a free space (11) lying between the two layers (9, 10) is connected to a first water collecting space (16) lying beneath the filter,
    the first water collecting space (16) lies below both of the filter layer and the two permeable layers (9, 10), wherein
a filter untreated space (5) lying upstream of the layer (10) that is flowed through first of the two layers (9, 10) is connected to a second water collecting space (15) inside the filter,
    both water collecting spaces (15, 16) lie beneath both the filter layer and the two permeable layers (9, 10),
    the permeable layers (9, 10) are both water-separating and are upstream of the water collecting spaces.

2. The fuel filter according to claim 1, wherein
the filter layer is embodied in the form of an annular filter element (2).

3. The fuel filter according to claim 2, wherein
the permeable layers (9, 10) are embodied as annular layers located upstream in front of the annular filter element (2).

4. The fuel filter according to claim 1, wherein
the permeable layers (9, 10) are made from the same material.

5. The fuel filter according to claim 1, wherein
the permeable layers (9, 10) have the same thickness.

6. The fuel filter according to claim 1, wherein
the thickness of the permeable layers (9, 10) amounts in each case to between 2 and 6 mm.

7. The fuel filter according to claim 6, wherein
the thickness of the permeable layers (9, 10) amounts in each case to 4 mm.

8. The fuel filter according to claim 2, wherein
the permeable layer (9) lying upstream adjacent to the annular filter element (2) is integrated into the external peripheral surface of the annular filter element or is embodied by the latter.

9. The fuel filter according to claim 2, wherein
the first water collecting space (16) is bounded by
    a closed end face (8) of the annular filter element (2),
    an annular closure bottom (12) of the free space (11) between the two layers (9, 10), said closure bottom surrounding the closed end face (8), wherein this annular closure bottom (12) has connection openings between the free space (11) and the first water collecting space (16), a first bottom tank (14) with tank edges lying tightly adjacent to the radial outer regions of the annular closure bottom (12).

10. The fuel filter according to claim 2,
wherein
the second water collecting space (15) is bounded by a second bottom tank with a radially outer connection to the in-flow untreated space (5) of the radially outer permeable layer (10), said second bottom tank surrounding the first bottom tank (14) at a distance.

11. The fuel filter according to claim 10,
wherein
the second bottom tank is constituted by the filter housing (1).

12. The fuel filter according to claim 10,
wherein
the first bottom tank (14) has a closable drainage channel (18) passing through the second bottom tank.

* * * * *